United States Patent
Maehara

(10) Patent No.: US 7,070,025 B2
(45) Date of Patent: Jul. 4, 2006

(54) DRUM BRAKE APPARATUS

(75) Inventor: Toshifumi Maehara, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 10/944,005

(22) Filed: Sep. 20, 2004

(65) Prior Publication Data

US 2005/0061595 A1   Mar. 24, 2005

(30) Foreign Application Priority Data

Sep. 22, 2003  (JP) ................. P.2003-330244
Oct. 24, 2003  (JP) ................. P.2003-364137

(51) Int. Cl.
*F16D 51/00*  (2006.01)

(52) U.S. Cl. ................ 188/79.56; 188/328; 188/79.51; 188/79.54

(58) Field of Classification Search ............ 188/79.56, 188/328, 79.51, 79.54, 79.55, 1.11 W, 196 R, 188/196 B
See application file for complete search history.

(56) References Cited

U.S. PATENT DOCUMENTS 3,998,297 A * 12/1976 Aono ...................... 188/79.54
4,015,693 A *  4/1977 Hayashida et al. ...... 188/79.54

FOREIGN PATENT DOCUMENTS

| JP | B-43-21822 | 1/1964 |
| JP | B-51-12782 | 4/1976 |
| JP | B-56-34733 | 8/1981 |
| JP | B-63-33567 | 7/1988 |
| JP | B-2-21456  | 5/1990 |

* cited by examiner

*Primary Examiner*—Melanie Torres
(74) *Attorney, Agent, or Firm*—Morgan, Lewis & Bockius LLP

(57) ABSTRACT

An automatic clearance adjusting device 10 that automatically adjusts the position of brake shoes (3, 4) based on the wear includes an adjuster gear that is rotatably depending on the amount of how much the brake shoes are parted from each other, a cam plate (25) rotated integrally with the adjuster gear (23) to drive the strut (27) that restricts the position of the brake shoes (3, 4), and an adjuster restricting lever (33) that restricts the rotation of the adjuster gear (23) based on the pressing force from the wheel cylinder (6) that parts between the pair of brake shoes (3, 4).

6 Claims, 8 Drawing Sheets

DRUM BRAKE APPARATUS

The present invention claims foreign priority to Japanese patent applications nos. P. 2003-330244 filed on Sep. 22, 2003, and P. 2003-364137 filed on Oct. 24, 2003, the contents of which are incorporated herein by reference.

BACKGROUND OF THE INVENTION

1. Field of the Invention

The present invention relates to a drum brake apparatus having an automatic clearance adjusting device that adjusts position of brake shoes in accordance with a wear, and more particularly to an improvement for making it easier to assemble the apparatus into a vehicle and simplifying a clearance adjustment between a drum and each brake shoes after assembling them to the vehicle.

2. Description of the Related Art

Different kinds of conventional drum brake apparatuses are used for braking a vehicle in the travel. The drum brake apparatuses are for example classified into leading trailing type drum brake, two-leading type drum brake, and duo-servo type drum brake that are depended on the position of the brake shoes pressed against the inner circumferential surface of a drum in an approximately cylindrical shape.

When a drum brake apparatus of any of the types described above is provided in a vehicle, an automatic clearance adjusting device is typically incorporated. The adjusting device automatically adjusts the position of the pair of brake shoes that are provided and opposed in the internal space in the drum in accordance with the wear of the brake shoes so that the clearance between the brake shoes and the drum in a non-braked state is not increased by the wear.

Conventional automatic clearance adjusting devices can roughly be classified into micro-adjuster type that can only slightly adjust the feed amount of the brake shoes by a single occasion of braking operation (see for example Japanese Patent Examined Publication JP-B-56-34733 and JP-B-63-33567) and one-shot adjuster type that adjust the clearance between the brake shoes and the drum to a reference value at a time by a single occasion of braking operation (see for example Japanese Patent Examined Publication JP-B-43-21822, JP-B-51-12782 and JP-B-2-21456).

In a drum brake apparatus having the automatic clearance adjusting device of the conventional micro-adjuster type, however, when the initial clearance between the drum and brake shoes is set large for the ease of assembling them to a vehicle, braking operation must be repeated many times in order to adjust the clearance between the drum and brake shoes to an appropriate distance after assembling, in other words, it is cumbersome to adjust the clearance between the drum and brake shoes after assembling them to the vehicle.

When the initial clearance between the drum and brake shoes is set small at the time of assembling them to a vehicle in order to solve the problem, the operation of assembling them to the vehicle becomes difficult.

Meanwhile, in a drum brake apparatus having the automatic clearance adjusting device of the conventional one-shot adjuster type, if the initial clearance set between the drum and brake shoes at the time of assembling them to a vehicle is large, braking operation needs only be repeated once or a few times in order to adjust the clearance between the drum and brake shoes to an appropriate distance after assembling. Therefore, the operability in assembling them to the vehicle can be improved and the clearance between the drum and brake shoes can simply be adjusted after assembling.

In the conventional one-shot adjuster type, there is a possibility that the drum can be deformed for example by excessive braking force. If the deformation of the drum temporally increases a movable range of the brake shoes, the position of the brake shoes is adjusted in accordance with the increased movable range. Therefore, the clearance between the drum and the brake shoes to be secured in a non-braked state can be less than an appropriate distance, in other words, over-adjusting can happen. This may cause the brake shoes to be dragged.

SUMMARY OF THE INVENTION

The present invention is directed to a solution to the above described circumstances, and it is an object of the present invention to provide a drum brake apparatus that makes it easier to assemble the drum and brake shoes to a vehicle and to adjust the clearance between the drum and brake shoes after assembling them to the vehicle and prevents over-adjusting that causes the brake shoe dragging.

According to a first aspect of the present invention, there is provided a drum brake apparatus, comprising: a drum;
  first and second brake shoes provided in the drum;
  a wheel cylinder that presses the first and the second brake shoes; and
  an automatic clearance adjusting device that automatically adjusts positions of the first and second brake shoes in accordance with wear amounts of the first and second brake shoes, the automatic clearance adjusting device including:
    an adjuster gear rotatably supported on the first brake shoe;
    a cam plate having a cam surface on an outer peripheral surface thereof, the cam plate being formed integrally with the adjuster gear;
    a strut having a first end abutting against the cam surface and a second end abutting the second brake shoe;
    an adjuster spring biasing the adjuster gear and the cam plate to rotate in a predetermined direction in order to maintain the cam surface and the strut in an abutted state; and
    an adjuster restricting lever rotatably supported on the first brake shoe and provided between the wheel cylinder and the adjuster gear, the adjuster restricting lever having;
      a ratchet pawl engaging with the adjuster gear; and
      a rotation control portion,
  wherein the cam surface of the adjuster gear is formed in such a manner that a shortest distance between a rotation center of the adjuster gear and the cam surface where the ratchet pawl abuts is increased as the adjuster gear rotates in a biased direction, and
  the rotation control portion restricts the rotation of the adjuster gear caused by a biasing force of the adjuster spring when the wheel cylinder presses the rotation control portion.

According to a second aspect of the present invention according to the first aspect of the present invention, the adjuster gear and the cam plate are opposed to each other with a web of the first brake shoe therebetween and are integrally coupled with each other via a coupling part provided on an outer side of the web.

According to a third aspect of the present invention according to the first aspect of the present invention, the rotation control portion transmits a force from the wheel cylinder to the adjuster gear for restricting the rotation of the adjuster gear when a braking operation is applied.

According to a fourth aspect of the present invention according to the first aspect of the present invention, the rotation control portion compulsory engages the cam surface with the ratchet pawl for restricting the rotation of the adjuster gear when the braking operation is applied.

According to a fifth aspect of the present invention according to the first aspect of the present invention, a first distance defined between the ratchet pawl and the rotation center of the adjuster restricting lever is larger than a second distance defined between the rotation control portion and the rotation center of the adjuster restricting lever.

According to a sixth aspect of the present invention according to the first aspect of the present invention, the rotation control portion is provided on slightly outer side of the rotation center of the adjuster restricting lever.

According to a seventh aspect of the present invention according to the first aspect of the present invention, the wheel cylinder presses the rotation control portion against the biasing force of the adjuster spring.

According to an eighth aspect of the present invention according to the first aspect of the present invention, wherein the adjuster spring controls a start point that the rotation control portion restricts the rotation of the adjuster gear by a predetermined strength of the biasing force of the adjuster spring.

According to a ninth aspect of the present invention according to the first aspect of the present invention, the rotation control portion is projected from the first brake shoe in a wheel cylinder side.

According to a tenth aspect of the present invention, there is provided a drum brake apparatus, comprising:
a drum;
first and second brake shoes provided in the drum;
a wheel cylinder that presses the first and the second brake shoes; and
an automatic clearance adjusting device that automatically adjusts positions of the first and second brake shoes in accordance with wear amounts of the first and second brake shoes, the automatic clearance adjusting device including;
an adjuster gear rotatably supported at the first brake shoe, the adjuster gear having a ratchet teeth formed on an outer surface thereof;
an adjuster restricting lever including;
a tip end portion having a ratchet pawl which is capable of engaging with the ratchet teeth of the adjuster gear;
an intermediate portion having a controlling force receiving portion which receives a controlling force of the wheel cylinder; and
a proximal end portion rotatably supported on the first brake shoe at a position outer than the controlling force receiving portion;
a strut having a first end abutting against the adjuster restricting lever and a second end abutting the second brake shoe in order to maintain a distance between the first and second brake shoes;
a lever restricting spring biasing the adjuster restricting lever to a strut side in order to release the engagement between the ratchet teeth and the ratchet pawl of the adjuster restricting lever; and
an adjuster spring biasing the adjuster gear in a predetermined rotational direction,
wherein the outer surface of the adjuster gear is formed in such a manner that a shortest distance defined between a rotation center of the adjuster gear and the cam surface where the ratchet pawl abuts is increased as the adjuster gear rotates in a biased direction, and the wheel cylinder rotates the adjuster restricting lever against a biasing force of the lever restricting spring so as to engage the ratchet teeth with the ratchet pawl when the controlling force of the wheel cylinder becomes larger than a predetermined force.

According to an eleventh aspect of the present invention according to the tenth aspect of the present invention, a first distance defined between the rotation center of the proximal end and the ratchet pawl is larger than a second distance defined between the rotation center of the proximal end and the controlling force receiving portion so that the tip end portion having the ratchet pawl is greatly displaced with a small displacement of the controlling force receiving portion.

According to a twelfth aspect of the present invention according to the tenth aspect of the present invention, the rotation center of the adjuster restricting lever is provided on slightly outer side of the control force receiving portion.

According to a thirteenth aspect of the present invention according to the tenth aspect of the present invention, the wheel cylinder presses the controlling force receiving portion against the biasing force of the lever restricting spring.

According to a fourteenth aspect of the present invention according to the tenth aspect of the present invention, the lever restricting spring controls a start point that the adjuster restricting lever restricts the rotation of the adjuster gear by a predetermined strength of the biasing force of the lever restricting spring.

According to a fifteenth aspect of the present invention according to the tenth aspect of the present invention, the controlling force receiving portion is projected from the first brake shoe in a wheel cylinder side.

According to the first aspect of the present invention, when the brake is operated and one end of the wheel cylinder presses one end of the brake shoes, the brake shoes start to depart from each other. Then, before the brake shoes contact with the inner circumference of the drum, the adjuster gear and the cam plate are rotated by the biasing force of the adjuster spring so that one end of the strut forming a part of the automatic clearance adjusting device is not apart from the cam plate. In this way, the distance to part between the pair of brake shoes held through the strut is increased.

The distance to part between the pair of brake shoes through the strut is adjusted at a time in association with the movement of the brake shoes until the brake shoes contact the inner circumference of the drum. Therefore, similarly to the drum brake apparatus including the one-shot adjuster type automatic clearance adjusting device, if the initial clearance between the drum and the brake shoes is set large at the time of assembling them to a vehicle, the clearance between the drum and the brake shoes can be adjusted to an appropriate distance after assembling by carrying out the braking operation only once. Consequently, the initial clearance at the time of assembling to the vehicle may be set large, so that the operability in assembling to the vehicle can be improved, and the clearance between the drum and the brake shoes can simply be adjusted after assembling them to the vehicle.

After the brake shoes contact with the inner circumference of the drum, the braking force is generated as the brake shoes and the drum slide into contact, and from the point and on, drag from the brake shoes in contact with the drum acts upon the piston of the wheel cylinder, so that the controlling force transmitted to the brake shoes from the wheel cylinder increases depending upon the generated braking force.

When the controlling force transmitted from the wheel cylinder to the brake shoes increases, the adjuster restricting lever that receives the controlling force at the pivoting control portion is gradually pressed harder by the pivoting force from the adjuster gear in the direction to restrict the rotation of the adjuster gear. Then, when the generated braking force increases by at least a prescribed factor, the pivoting force from the adjuster restricting lever that has continued to increase until that point is balanced to the pivoting force from the adjuster gear, which prevents the pivotal movement of the adjuster gear and the cam plate.

In this way, if the braking force further increases and the drum deforms for example by excessive braking force, the adjusting operation to cause the brake shoes to follow the deformation of the drum, i.e., over-adjusting operation is not caused. Therefore, over-adjusting that can cause dragging of the brake shoes can be prevented.

According to the present invention, the adjuster gear and the cam plate can be formed into an integral structure simply by bending a metal plate having a coupling part provided with the adjuster gear at its one end and the cam plate at the other end at the coupling part. The structure is suitable for inexpensive mass-production by press-molding, which can effectively lower the manufacturing cost.

Since the adjuster gear and the cam plate are opposed to each other with the web of the brake shoe therebetween, the adjuster gear and the cam plate can be provided in a small space available on both sides of the web, so that the brake device can be compact.

According to the tenth aspect of the present invention, if braking operation is carried out and the wheel cylinder presses one end of one brake shoe, so that the brake shoes start to be parted from each other, the control force from the wheel cylinder is not more than a prescribed level until the brake shoes contact with the inner circumferential surface of the drum. During the period, the adjuster restricting lever is prevented from pivoting toward the adjuster gear by the energizing force from the lever restricting spring, so that the lever has its tip end kept in abutment against one end of the strut. Therefore, when the adjuster gear moves away from the strut in association with the displacement of the brake shoes toward the inner circumferential surface of the drum as they are parted, the ratchet pawl of the adjuster restricting lever is disengaged from the ratchet teeth of the adjuster gear. Then, the adjuster gear is pivoted by the energizing force from the adjuster spring so that the ratchet teeth whose distance from the center of rotation is large advances to the position to engage with the ratchet pawl, and the gear is pivoted all the way until the ratchet teeth reach the position to engage with the ratchet pawl.

When the adjuster gear pivots to change the engagement position of the ratchet teeth with the ratchet pawl, the radius from the engagement position between the ratchet teeth and the ratchet pawl to the rotation center of the adjuster gear increases, and as a result, the distance between the brake shoes through the strut, the adjuster restricting lever, and the adjuster gear is increased.

The distance between the brake shoes through the strut, the adjuster restricting lever, and the adjuster gear is adjusted in association with the movement of the brake shoes all the way until they contact with the inner circumferential surface of the drum. Therefore, if the initial clearance between the drum and the brake shoes is set large at the time of assembling them to a vehicle as with the drum brake device including the conventional one-shot adjuster type automatic clearance adjusting device, braking operation needs only be carried out once in order to adjust the clearance between the drum and the brake shoes to an appropriate distance after assembling them. Therefore, the initial clearance can be set large during assembling them to the vehicle, so that the operability in assembling them to the vehicle can be improved and the clearance between the drum and the brake shoes after assembling them to the vehicle can easily be adjusted.

After the brake shoes contact with the inner circumferential surface of the drum, the brake shoes and the drum slide against each other in contact to generate braking force, and thereafter, drag from the brake shoes in contact with the drum acts upon the piston of the wheel cylinder, so that the control force transmitted to the brake shoe from the wheel cylinder increases based on the generated braking force.

The control force from the wheel cylinder is inputted to the control force receiving portion of the adjuster restricting lever and then transmitted to one of the brake shoes through the adjuster restricting lever. When the braking force is increased and the control force from the wheel cylinder inputted to the adjuster restricting lever reaches at least a prescribed level, the pivoting force toward the adjuster gear provided by the control force from the wheel cylinder and acting upon the adjuster restricting lever is greater than the energizing force from the adjuster restricting spring, so that the pivotal movement to displace the tip end of the adjuster restricting lever toward the adjuster gear is caused and the ratchet pawl of the adjuster restricting lever is forced to be engaged with the ratchet teeth of the adjuster gear. In this way, the adjuster gear is prevented from pivoting.

Therefore, if the braking force further increases thereafter and causes the drum to deform, adjusting operation to make the brake shoes follow the deformation of the drum is not caused. Consequently, over-adjusting that may cause the brake shoes to be dragged can be prevented.

According to the present invention, in the adjuster restricting lever, the distances constituting a lever ratio are set so that small displacement of the control force receiving portion greatly displaces the ratchet pawl on the tip end side. Therefore, when the control force increases by at least a prescribed factor, the ratchet pawl can instantaneously be engaged with the ratchet teeth.

DETAILED DESCRIPTION OF THE PREFERRED EMBODIMENTS

Now, a drum brake apparatus according to a preferred embodiment of the invention will be described in detail in conjunction with the accompanying drawings.

Figure 1:
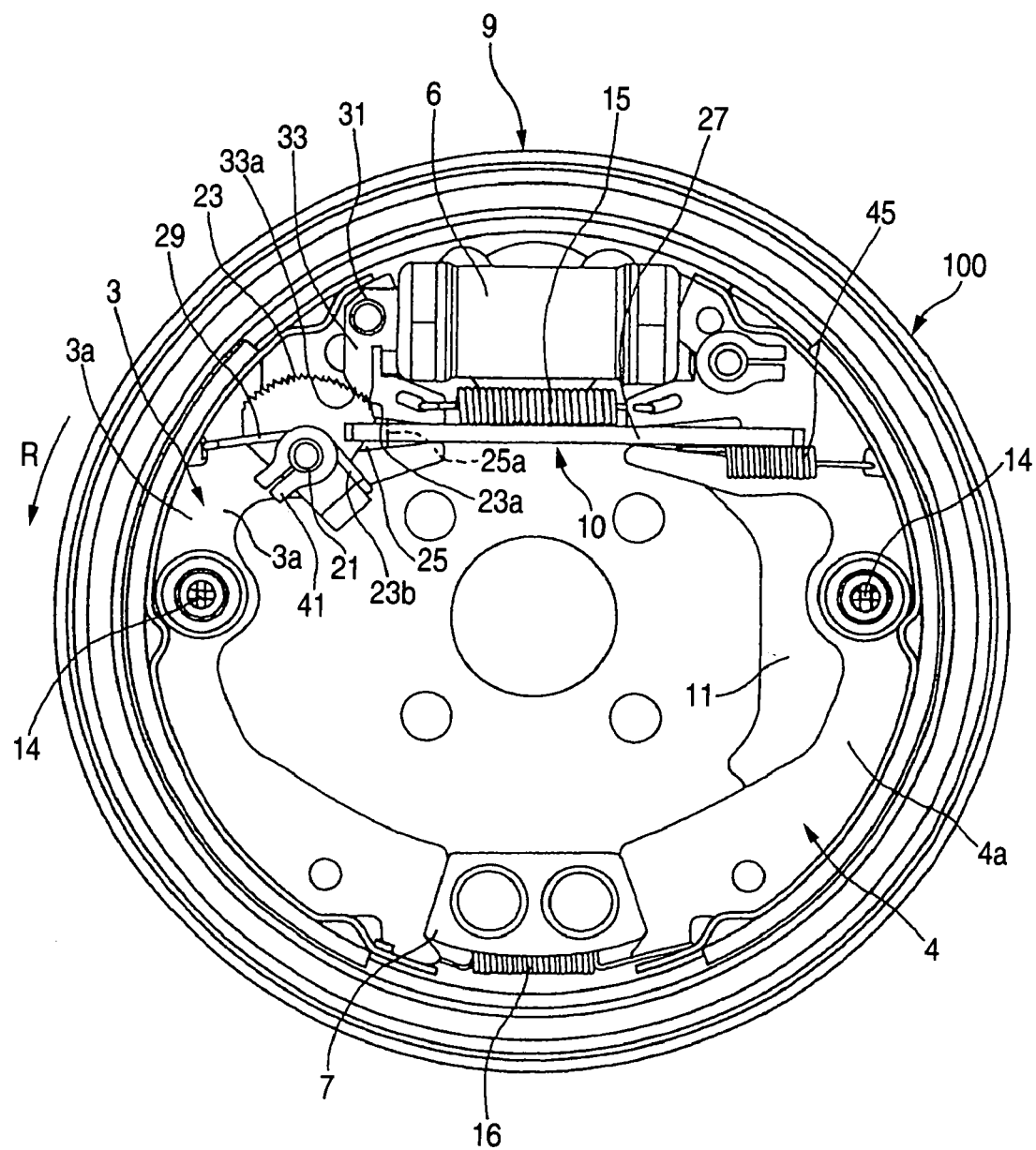
FIG. 1 is a front view of a drum brake apparatus according to one embodiment of the invention.

FIG. 1 is a front view of a drum brake apparatus according to one embodiment of the invention.

The drum brake apparatus 100 according to the embodiment includes a brake shoe pair consisting of a leading shoe 3 and trailing shoe 4 provided opposed to each other in a space in an approximately cylindrical drum that is not shown, a wheel cylinder 6 provided on one side of opposed ends of the pair of brake shoes 3 and 4 to generate shoe controlling force to press the brake shoes 3 and 4 against the drum, an anchor member 7 provided on the side of the other opposed ends of the brake shoes 3 and 4, a backing plate 9 supporting these components, an automatic clearance adjusting device 10 that automatically adjusts the position of the brake shoes 3 and 4 based on the wear of the brake shoes 3 and 4 so that the clearance between the brake shoes 3 and 4 and the drum in a non-braked state is not increased by the wear, and a parking lever 11 that parts between the brake shoes 3 and 4 to generate braking force when the vehicle parks.

Note that the drum that is not shown is concentric with the backing plate 9 and rotates in the direction of the arrow R shown in FIG. 1 when the vehicle moves forward.

The brake shoes 3 and 4 are attached to the backing plate 9 by a shoe support shaft 14 so that they can move toward the inner circumference of the drum.

Figure 3:
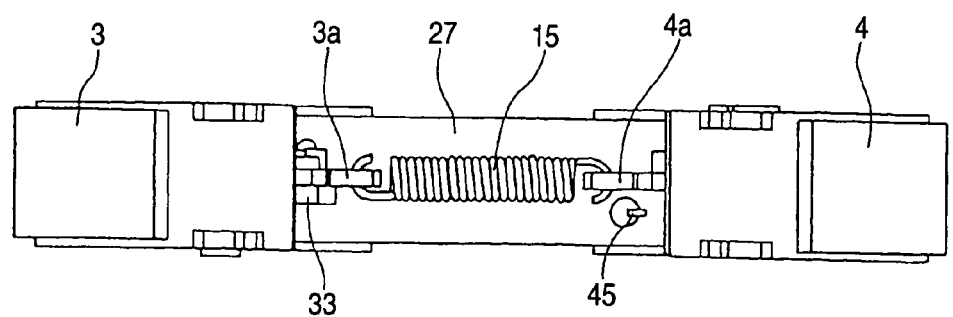
FIG. 3 is a view seen in the direction of the arrow A n FIG. 2.

As shown in FIG. 3, the ends of the brake shoes 3 and 4 on the side of the wheel cylinder 6 are energized by a shoe-to-shoe spring 15 in the direction in which the ends of the shoes come close to each other (i.e., away from the drum), and the ends of the shoes are maintained in abutment against the piston of the wheel cylinder 6.

The ends of the brake shoes 3 and 4 on the side of the anchor member 7 are energized by an anchor spring 16 in the direction in which the ends of the shoes come close to each other (i.e., away from the drum), and the ends of the shoes are maintained in abutment against the anchor member 7.

Figure 2:
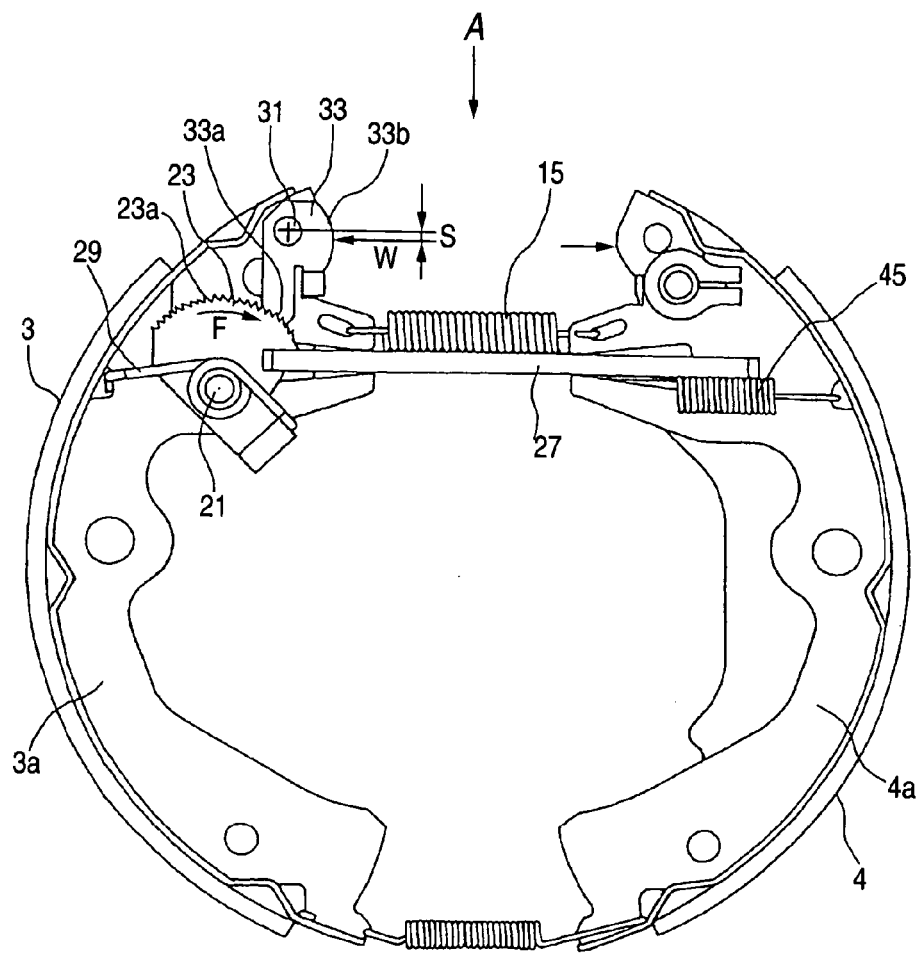
FIG. 2 is a view for use in illustration of how the pair of the brake shoes and the automatic clearance adjusting device shown in FIG. 1 are coupled with each other.
Figure 4:
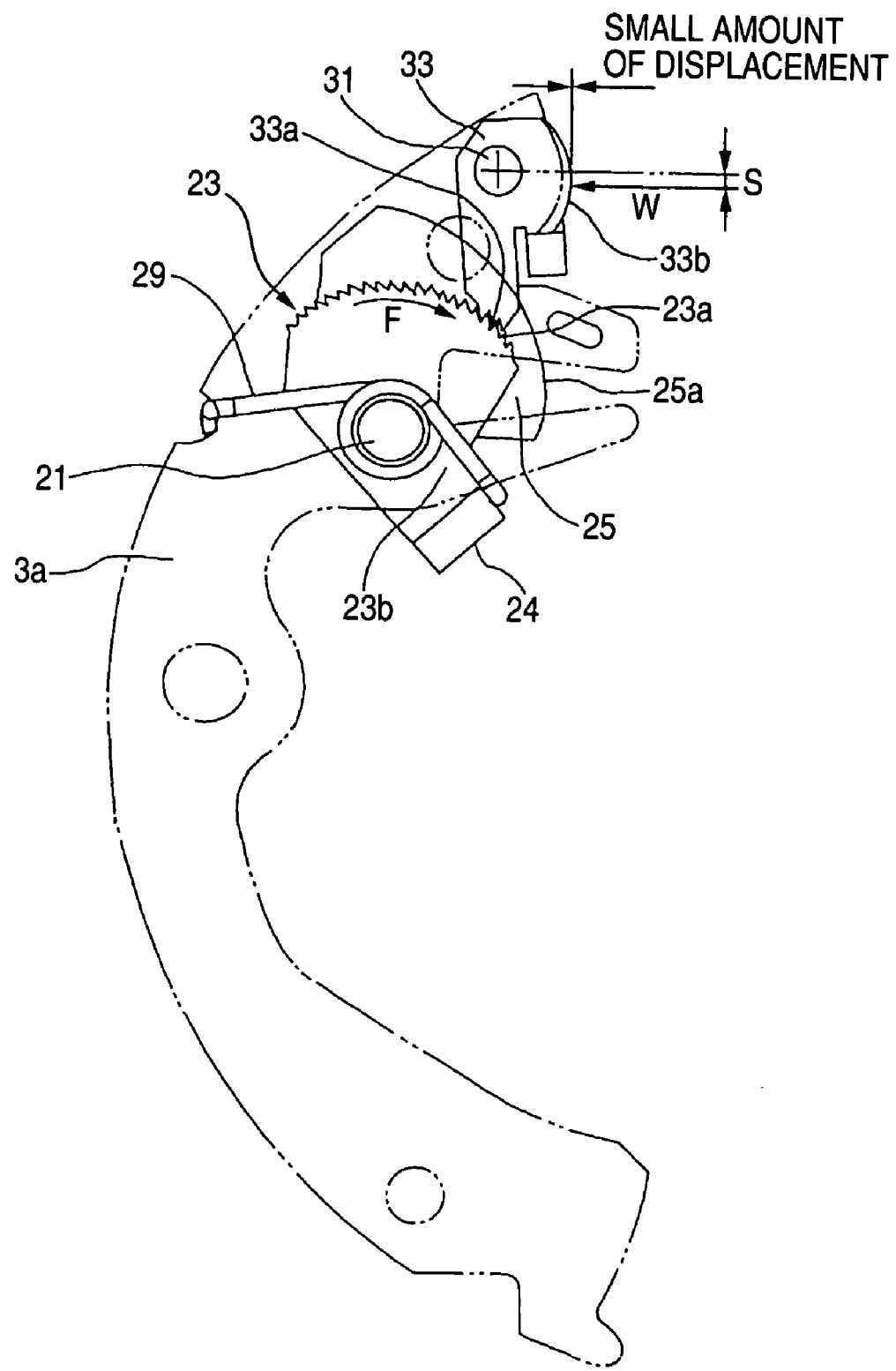
FIG. 4 is an expanded view showing the positional relation between the adjuster gear and the cam plate and the adjuster restricting lever shown in FIG. 1.
Figure 5:
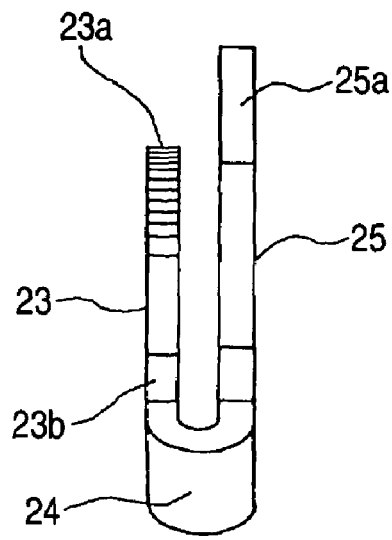
FIG. 5 is a side view of the adjuster gear and the cam plate in FIG. 4 in an integral form.

Now, also referring to FIG. 2, the automatic clearance adjusting device 10 according to the embodiment includes a pin 21 provided upright on the web 3a on one end side of the brake shoe 3 pressed by the wheel cylinder 6 during braking operation, an adjuster gear 23 rotatably supported at the web 3a through the pin 21 and integrally provided with a cam plate 25 having a cam surface 25a whose distance from the center of rotation gradually increases at its outer periphery as can clearly be seen from FIGS. 4 and 5, a strut 27 having its one end abutted against the cam surface 25a and the other end abutted against the web 4a of the brake shoe 4, an adjuster spring 29 that rotates the adjuster gear 23 and the cam plate 25 in a prescribed rotation direction (clockwise) so that the cam surface 25a is kept in abutment against one end of the strut 27 when the pair of brake shoes 3 and 4 are parted by pressure provided by the wheel cylinder 6, a pin 31 provided upright on the web 3a of the brake shoe 3 between the wheel cylinder 6 and the adjuster gear 23, and an adjuster restricting lever 33 rotatably supported on the web 3a through the pin 31.

The adjuster gear 23 has ratchet teeth 23a at the arch part around the pin 21 and an arm part 23b to which one end of the adjuster spring 29 is engaged.

As shown in FIG. 4, the cam surface 25a formed at the cam plate 25 has a mildly curved surface whose distance e (see FIG. 7) to the pin 21 progressively increases when it rotates clockwise around the pin 21 (in the direction denoted by the arrow F).

As shown in FIGS. 4 and 5, the adjuster gear 23 and the cam plate 25 are opposed to each other with the web 3a of the brake shoe 3 therebetween, integrally coupled through a coupling part 24 passing through the outer side of the web 3a and produced from a metal plate by press-molding.

The adjuster spring 29 is a helical torsion spring that engages with pin 21 and energizes the adjuster gear 23 in the direction of the arrow F in FIG. 4. The adjuster spring 29 and the adjuster gear 23 are prevented from being pulled out by a clip 41 engaged with the pin 21.

The other end of the strut 27 is pulled toward the brake shoe 4 by a helical extension spring 45 and kept in abutment against the brake shoe 4.

Therefore, the strut 27 moves along with the brake shoe as the brake shoes 3 and 4 are parted, and when the movement causes one end of the strut 27 to depart from the cam surface 25a of the cam plate 25, the adjuster spring 29 pivots the adjuster gear 23 and the cam plate 25 in the direction of the arrow F in FIG. 4 so that the cam surface 25a and the end of the strut 27 are kept in contact.

Figure 6:
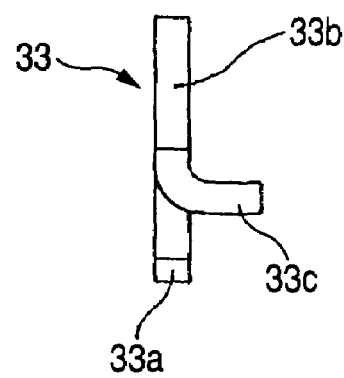
FIG. 6 is a side view of the adjuster restricting lever shown in FIG. 4.

As shown in FIGS. 4 and 6, the adjuster restricting lever 33 includes a ratchet pawl 33a that engages with the adjuster gear 23 to prevent the adjuster gear 23 from being reversely rotated, a pivoting control portion 33b that receives pressing force by the wheel cylinder 6 during braking operation, and a bent portion 33c that abuts against the side surface of the web 3a during assembling to the web 3a for approximate positioning.

As shown in FIG. 4, the pivoting control portion 33b receives controlling force W from the wheel cylinder 6 in a position a distance s shifted from the pin 31 to the adjuster gear 23. When the controlling force W from the wheel cylinder 6 acts upon the pivoting control portion 33b, the adjuster restricting lever 33 pivots clockwise around the pin 31 in FIG. 4. The pivoting force from the adjuster restricting lever 33 acts in the direction to restrict the pivotal movement of the adjuster gear 23 caused by biasing the adjuster spring 29.

Figure 7:
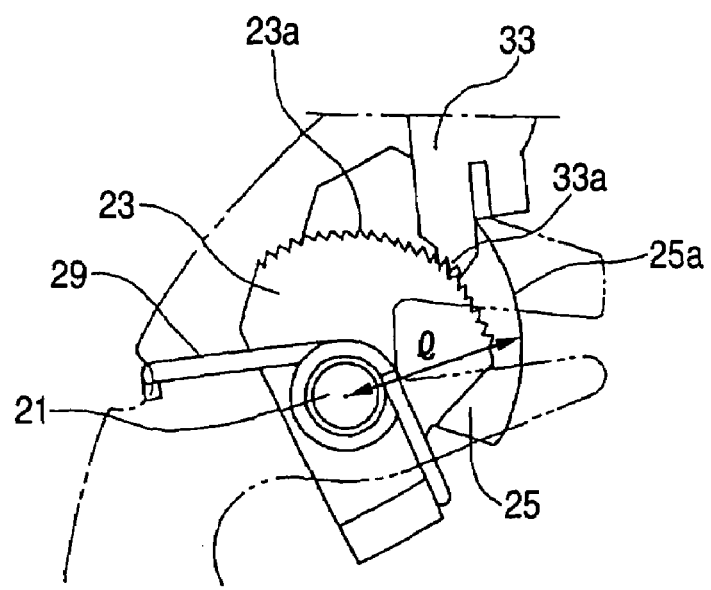
FIG. 7 is an enlarged view of the state after clearance adjusting operation by the automatic clearance adjusting device in FIG. 4 has further advanced.

In the drum brake apparatus 100 described above, the braking operation is carried out and the wheel cylinder 6 presses one end of the brake shoe 3 and the brake shoes start to be parted. Then, during the period before the brake shoes 3 and 4 contact the inner circumferential surface of the drum, the adjuster gear 23 and the cam plate 25 are energized by the adjuster spring 29 to pivot so that one end of the strut 27 which is part of the automatic clearance adjusting device 10 does not depart from the cam plate 25 and the distance between the brake shoes 3 and 4 held through the strut 27 is increased as shown in FIG. 7.

The distance between the pair of brake shoes 3 and 4 is adjusted through the strut 27 at a time in association with the movement of the brake shoes 3 and 4 until the brake shoes 3 and 4 contact the inner circumferential surface of the drum. Therefore, if the initial clearance between the drum and the brake shoes is set large at the time of assembling them to a vehicle as with the drum brake apparatus including the conventional one-shot adjuster type automatic clearance adjusting device, braking operation needs only be carried out once in order to adjust the clearance between the drum and the brake shoes to an appropriate distance after assembling them. Therefore, the initial clearance can be set large during assembling them to the vehicle, so that the operability in assembling them to the vehicle can be improved and the clearance between the drum and the brake shoes after assembling them to the vehicle can easily be adjusted.

After the brake shoes 3 and 4 contact the inner circumferential surface of the drum, the brake shoes 3 and 4 and the drum slide against each other in contact to generate braking force, and thereafter, drag from the brake shoes in contact with the drum acts upon the piston of the wheel cylinder 6, so that the controlling force transmitted to the brake shoe 3 from the wheel cylinder 6 increases based on the generated braking force.

When the controlling force W transmitted from the wheel cylinder 6 to the brake shoe 3 increases, the adjuster restricting lever 33 that receives the controlling force W at the pivoting control portion 33b presses the adjuster gear 23 gradually harder in the direction to restrict the pivotal movement of the adjuster gear 23. When the generated braking force increases by at least a prescribed factor, the pivoting force from the adjuster restricting lever 33 that has increased until then is balanced with the pivoting force from the adjuster gear 23 provided by the adjuster spring 29, so that the adjuster gear 23 and the cam plate 25 are prevented from pivoting.

Therefore, if the braking force increases thereafter and causes the drum to deform, adjusting operation to make the brake shoes follow the deformation of the drum is not caused. In this way, over-adjusting that may cause the brake shoes to be dragged can be prevented.

In the above-described drum brake apparatus 100, the adjuster gear 23 and the cam plate 25 can be formed into an integral structure simply by bending a metal plate having a coupling part 24 provided with the adjuster gear 23 at its one end and the cam plate 25 at the other end at the coupling part 24. The structure can be suitable for inexpensive mass-production by press-molding, which can effectively reduce the manufacturing cost.

Since the adjuster gear 23 and the cam plate 25 are opposed to each other with the web 3a of the brake shoe 3 therebetween, the adjuster gear 23 and the cam plate 25 can be provided in a small space available on both sides of the web 3a, so that the brake device can be compact.

Now, a drum brake device according to a preferred second embodiment of the invention will be described in detail in conjunction with the accompanying drawings.

Figure 8:
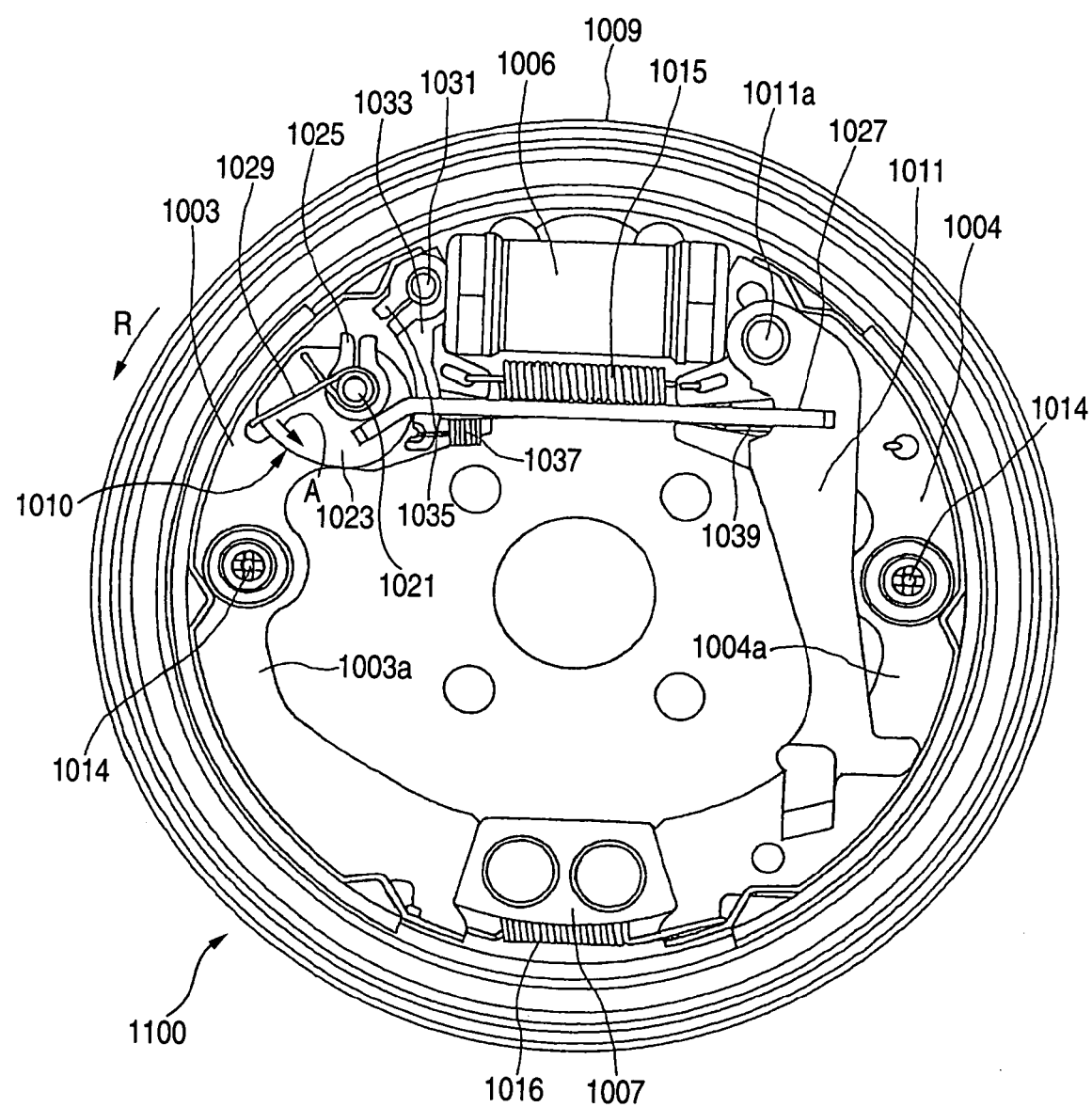
FIG. 8 is a front view of a drum brake device according to one embodiment of the invention.
Figure 9:
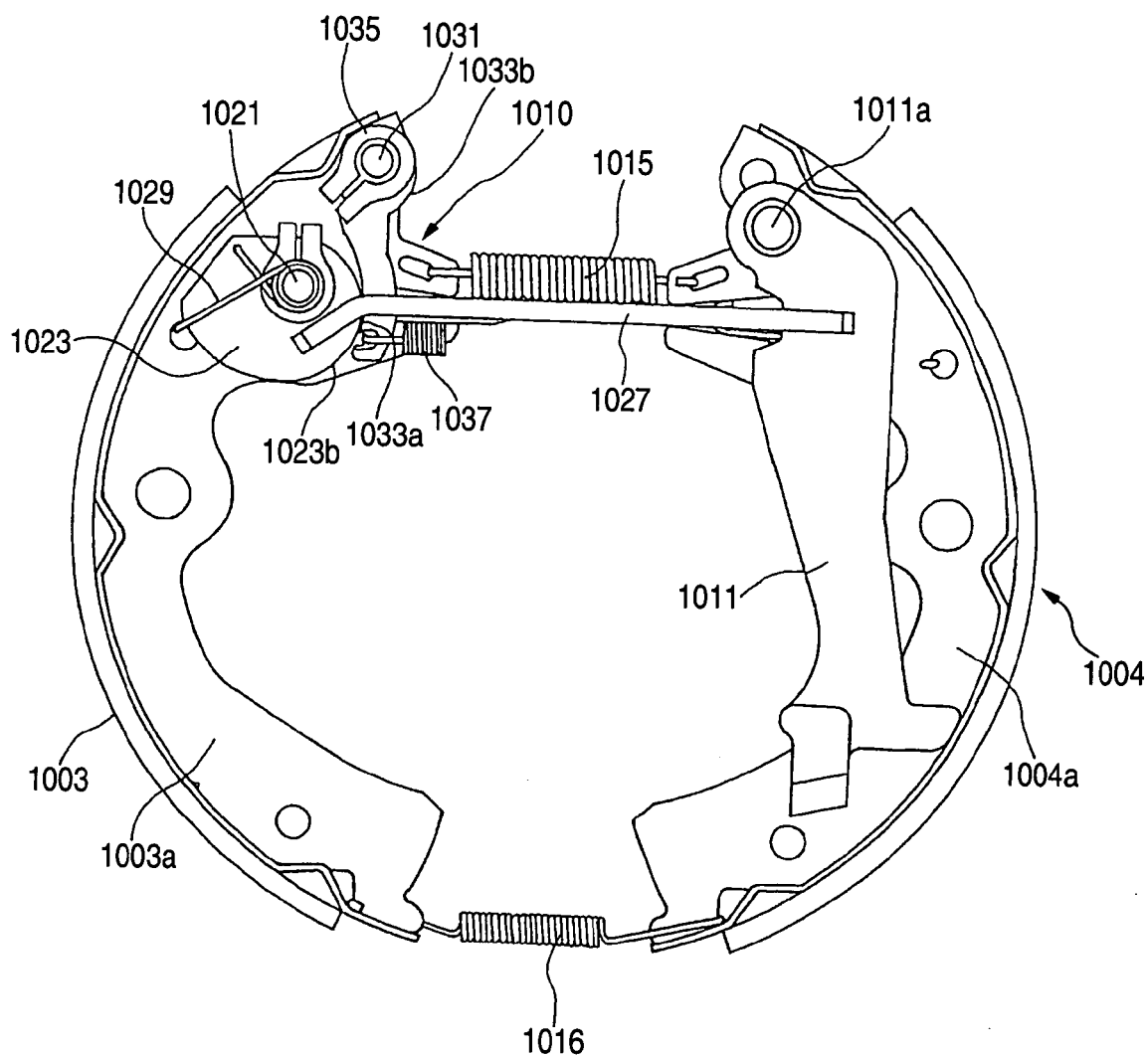
FIG. 9 is a view for use in illustration of how the pair of the brake shoes and the automatic clearance adjusting device shown in FIG. 8 are coupled with each other.
Figure 10:
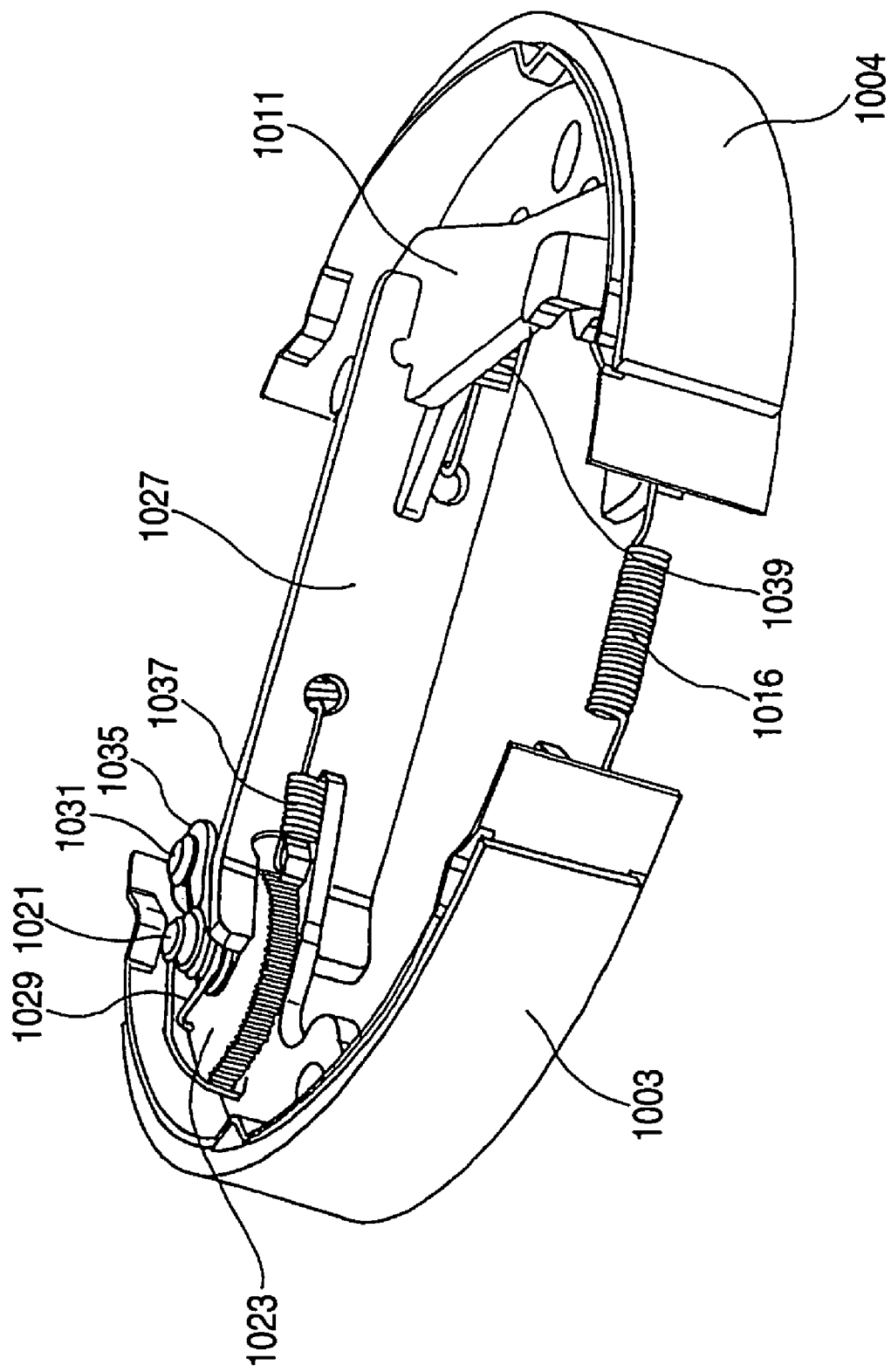
FIG. 10 is a perspective view of FIG. 9.

FIG. 8 is a front view of a drum brake device according to one embodiment of the invention.

The drum brake device 1100 according to the embodiment includes a brake shoe pair consisting of a leading shoe 1003 and a trailing shoe 1004 provided opposed to each other in a space in an approximately cylindrical drum that is not shown, a wheel cylinder 1006 provided on one side of opposed ends of the pair of brake shoes 1003 and 1004 to generate shoe control force to press the brake shoes 1003 and 1004 against the drum, an anchor member 1007 provided on the side of the other opposed ends of the brake shoes 1003 and 1004 and receiving braking force from the brake shoes 1003 and 1004, a backing plate 1009 supporting these components, an automatic clearance adjusting device 1010 that automatically adjusts the position of the brake shoes 1003 and 1004 based on the wear of the brake shoes 1003 and 1004 so that the clearance between the brake shoes 1003 and 1004 and the drum in a non-braked state is not increased by the wear, and a parking lever 1011 pivotably coupled to the brake shoe 1004 through a pin 1011a and pivoting to part between the brake shoes 1003 and 1004 to generate braking force when the vehicle parks.

Note that the drum that is not shown is concentric with the backing plate 1009 and rotates in the direction of the arrow R shown in FIG. 8 when the vehicle moves forward.

The brake shoes 1003 and 1004 are each attached to the backing plate 1009 by a shoe support shaft 1014 so that they can move toward the inner circumference of the drum.

The ends of the brake shoes 1003 and 1004 on the side of the wheel cylinder 1006 are energized by a shoe-to-shoe spring 1015 in the direction in which the ends of the shoes come close to each other (i.e., away from the drum), and the ends of the shoes are kept in abutment against the piston of the wheel cylinder 1006.

The ends of the brake shoes 1003 and 1004 on the side of the anchor member 1007 are energized by an anchor spring 1016 in the direction in which the ends of the shoes come close to each other (i.e., away from the drum), and the ends of the shoes are kept in abutment against the anchor member 1007.

Figure 11:
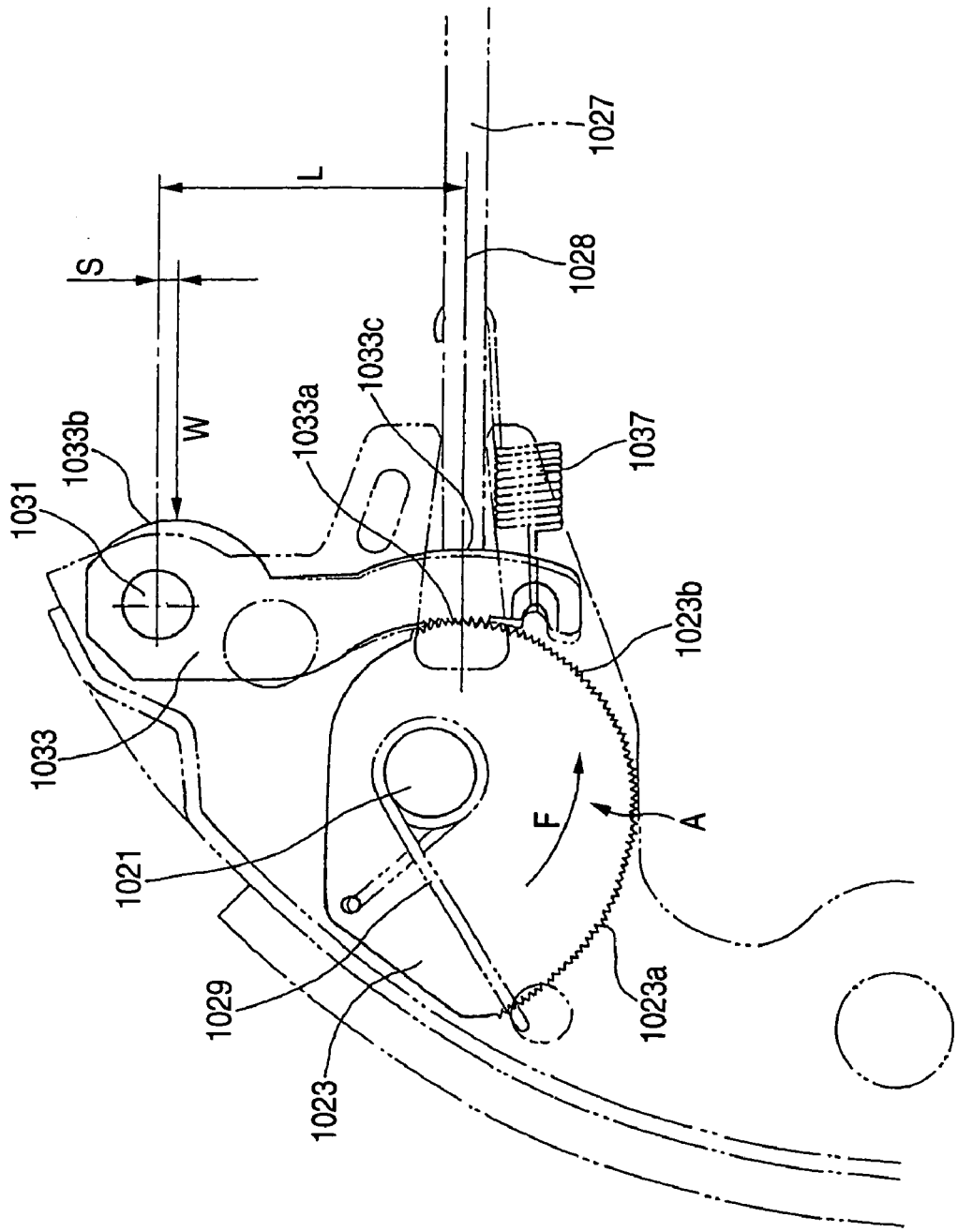
FIG. 11 is an enlarged view showing the positional relation between the adjuster gear and the adjuster restricting lever and the strut in the automatic clearance adjusting device shown in FIG. 8.

As shown in FIG. 11, the automatic clearance adjusting device 1010 according to the embodiment includes a gear supporting pin 1021 provided upright on the web 1003a of the brake shoe 1003 on the side of the wheel cylinder 1006, an adjuster gear 1023 rotatably supported at the web 1003a through the gear supporting pin 1021 and having ratchet teeth 1023b at its outer peripheral surface 1023a whose distance from the center of rotation gradually increases, an adjuster restricting lever 1033 having a ratchet pawl 1033a engaged with the ratchet teeth 1023b at its one tip end side, and a plate-shaped strut 1027 having its one end abutted against the brake shoe 1003 and the other end abutted against the brake shoe 1004 through the adjuster restricting lever 1033 and the adjuster gear 1023 to keep the distance between the pair of brake shoes 1003 and 1004.

The adjuster gear 1023 is prevented from being pulled out from the gear supporting pin 1021 by a clip 1025 engaged with the axial end of the gear supporting pin 1021 and has its rotation direction restricted by the adjuster spring 1029 wound around the gear supporting pin 21.

The adjuster spring 1029 energizes the adjuster gear 1023 in the direction of the arrow A in FIG. 11 so that the adjuster gear 1023 advances to the engagement position with the ratchet pawl 1033a where the distance from the rotation center of the gear supporting pin 1021 is larger when the ratchet teeth 1023b and the ratchet pawl 1033a are disengaged.

Note that the energizing force from the adjuster spring 1029 constantly acts upon the adjuster gear 1023, while in a no-braked state, the spring force of a shoe-to-shoe spring 1015 acts upon the engagement part between the ratchet teeth 1023b and the ratchet pawl 1033a, and therefore the engagement position is not changed.

The adjuster restricting lever 1033 has its proximal end rotatably supported by a lever supporting pin 1031 provided upright on the web 1003a and is prevented from being pulled out by a clip 1035 engaged with the axial end of the lever supporting pin 1031.

The lever supporting pin 1031 is provided upright on the 1003a of the brake shoe 1003 more on the outer side than the point where the control force from the wheel cylinder 1006 acts upon the brake shoe 1003.

A circular control force receiving portion 1033b to receive the control force from the wheel cylinder 1006 is provided in the middle part of the adjuster restricting lever 1033. On the other side of the tip end of the adjuster restricting lever 1033, there is an abutment surface 1033c against which one end of the strut 1027 is abutted.

The ratchet pawl 1033a and the abutment surface 1033c are opposed to each other on an extended line 1028 from the central axial line of the strut 1027. More specifically, the ratchet teeth 1023b and the ratchet pawl 1033a are engaged in a position on the extended line 1028 from the central axial line of the strut 1027.

According to the embodiment, in the adjuster restricting lever 1033, the lever ratio L:S is set so that small displacement of the control force receiving portion 1033b greatly displaces the tip end having the ratchet pawl 1033a. For the ratio, L represents the distance from the center of rotation of the proximal end to the ratchet pawl 1033a engaged with the ratchet teeth 1023b, and S represents the distance from the center of rotation of the proximal end to the control force receiving portion 1033b.

The strut 1027 has its one end coupled to the adjuster restricting lever 1033 by a lever restricting spring 1037, and the other end side coupled to the brake shoe 1004 by a connecting spring 1039.

The lever restricting spring 1037 energizes the adjuster restricting lever 1033 toward the strut 1027 in order to prevent the pivotal movement of the adjuster restricting lever 1033 toward the adjuster gear 1023 driven by the control force from the wheel cylinder 1006 when the control force from the wheel cylinder 1006 is not more than a prescribed level.

Therefore, when the control force from the wheel cylinder 1006 is not more than the prescribed level, the abutment surface 1033c of the adjuster restricting lever 1033 is kept in abutment against one end of the strut 1027 by the energizing force from the lever restricting spring 1037.

The connecting spring 39 keeps the other end of the strut 1027 in abutment against the web 1004a of the brake shoe 1004.

Note that the parking lever 1011 pivots to press and displace the strut 1027 to the side of the brake shoe 1003, so that the pair of brake shoes 1003 and 1004 are parted to generate braking force.

In the automatic clearance adjusting device 1010 in a braking operation state in which the control force W from the wheel cylinder 1006 is at least in a prescribed level, the control force W from the wheel cylinder 1006 pivots the tip end of the adjuster restricting lever 1033 toward the adjuster gear 1023 against the energizing force from the lever restricting spring 1037, so that the ratchet teeth 1023b and the ratchet pawl 1033a are kept in an engaged state and the clearance adjustment by the pivotal movement of the adjuster gear 1023 is restricted.

In the above described drum brake device 1100, the braking operation is made, so that the wheel cylinder 1006 presses one end of the brake shoe 1003 through the adjuster restricting lever 1033 and the brake shoes 1003 and 1004 start to be parted. If the brake shoes 1003 and 1004 start to be parted from each other, however, the control force W from the wheel cylinder 1006 is not more than a prescribed level until the brake shoes 1003 and 1004 contact with the inner circumferential surface of the drum. Therefore, during the period, the adjuster restricting lever 1033 is prevented from pivoting toward the adjuster gear 1023 by the energizing force from the lever restricting spring 1037, so that the abutment surface 1033c provided at the tip end is kept in abutment against one end of the strut 1027. Therefore, as the brake shoe 1003 is displaced toward the inner circumferential surface of the drum and the adjuster gear 1023 moves away from the strut 1027, the ratchet pawl 1033a of the adjuster restricting lever 1033 is disengaged from the ratchet teeth 1023b of the adjuster gear 1023. Then, the adjuster gear 1023 is pivoted by the energizing force of the adjuster spring 1029, so that the ratchet teeth 1023b whose distance from the rotation center is large moves to the engagement position with the ratchet pawl 1033a, and the adjuster gear 1023 is pivoted all the way until it reaches the position where the ratchet teeth 1023b engages with the ratchet pawl 1033a on the adjuster restricting lever 1033.

When the adjuster gear 1023 pivots to change the engagement position of the ratchet teeth 1023b with the ratchet pawl 1033a, the radius from the engagement position to the rotation center of the adjuster gear 1023 increases, and as a result, the distance between the brake shoes 1003 and 1004 through the strut 1027, the adjuster restricting lever 1033, and the adjuster gear 1023 is increased.

The distance between the brake shoes 1003 and 1004 through the strut 1027, the adjuster restricting lever 1033, and the adjuster gear 1023 is adjusted in association with the movement of the brake shoes 1003 and 1004 all the way until the brake shoes contact with the inner circumferential surface of the drum. Therefore, if the initial clearance between the drum and the brake shoes 1003 and 1004 is set large at the time of assembling them to a vehicle as with the drum brake device including the conventional one-shot adjuster type automatic clearance adjusting device, braking operation needs only be carried out once in order to adjust the clearance between the drum and the brake shoes 1003 and 1004 to an appropriate distance after assembling them. Therefore, the initial clearance can be set large during assembling them to the vehicle, so that the operability in assembling them to the vehicle can be improved and the clearance between the drum and the brake shoes 1003 and 1004 after assembling them to the vehicle can easily be adjusted.

After the brake shoes 1003 and 1004 contact with the inner circumferential surface of the drum, the brake shoes 1003 and 1004 and the drum slide against each other in contact to generate braking force, and thereafter, drag from the brake shoes 1003 and 1004 in contact with the drum acts upon the piston of the wheel cylinder 1006, so that the control force W transmitted to the brake shoe 1003 from the wheel cylinder 1006 increases based on the generated braking force.

The control force W transmitted from the wheel cylinder 1006 is input to the control force receiving portion 1033b of the adjuster restricting lever 1033 and transmitted to the brake shoe 1003 through the adjuster restricting lever 1033. When the braking force increases by a prescribed factor, and the control force W from the wheel cylinder 1006 inputted to the control force receiving portion 1033b of the adjuster restricting lever 1033 reaches a prescribed level or more, the pivoting force toward the adjuster gear 1023 acting upon the adjuster restricting lever 1033 is greater than the energizing force provided by the lever restricting spring 1037, so that the pivotal movement to displace the tip end of the adjuster restricting lever 1033 toward the adjuster gear 1023 is generated and the ratchet pawl 1033a of the adjuster restricting lever 1033 is forced to be engaged with the ratchet teeth 1023b of the adjuster gear 1023. In this way, the adjuster gear 1023 is prevented from pivoting.

Therefore, if the braking force increases to an excessive level thereafter and causes the drum to deform, adjusting operation to make the brake shoes follow the deformation of the drum is not caused. Consequently, over-adjusting that may pause the brake shoes to be dragged can be prevented.

According to the embodiment, the distances L and S, i.e., the values constituting the lever ratio are set so that the adjuster restricting lever 1033 offsets the position of the lever supporting pin 1031 that serves as the rotation supporting point of the proximal end slightly more on the outer side than the position where the control force W from the wheel cylinder 1006 acts upon, so that tip end having the ratchet pawl 1033a is displaced by small displacement of the control force receiving portion 1033b. The lever ratio is set in this way and therefore small displacement of the control force receiving portion 1033b greatly displaces the ratchet pawl 1033a on the tip end side, so that when the braking force increases more than by a prescribed factor, the ratchet pawl 1033a can instantaneously be engaged with the ratchet teeth 1023b. Therefore, over-adjusting caused by a dull operation of the adjuster restricting lever can be prevented.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

Note that the manner of providing the brake shoes in the drum brake device including the automatic clearance adjusting device according to the invention is not limited to that of the above-described embodiment. The automatic clearance adjusting device according to the invention may be provided in any of drum brake devices such as leading trailing type, two-leading type, and duo-servo type devices.

What is claimed is:

1. A drum brake apparatus, comprising:
    a drum;
    first and second brake shoes provided in the drum;
    a wheel cylinder that presses the first and the second brake shoes; and
    an automatic clearance adjusting device that automatically adjusts positions of the first and second brake shoes in accordance with wear amounts of the first and second brake shoes, the automatic clearance adjusting device including;
        an adjuster gear rotatably supported at the first brake shoe, the adjuster gear having a ratchet teeth formed on an outer surface thereof;
        an adjuster restricting lever including;
            a tip end portion having a ratchet pawl which is capable of engaging with the ratchet teeth of the adjuster gear;
            an intermediate portion having a controlling force receiving portion which receives a controlling force of the wheel cylinder; and
            a proximal end portion rotatably supported on the first brake shoe at a position outer than the controlling force receiving portion;
        a strut having a first end abutting against the adjuster restricting lever and a second end abutting the second brake shoe in order to maintain a distance between the first and second brake shoes;
        a lever restricting spring biasing the adjuster restricting lever to a strut side in order to release the engagement between the ratchet teeth and the ratchet pawl of the adjuster restricting lever; and
        an adjuster spring biasing the adjuster gear in a predetermined rotational direction,
    wherein the outer surface of the adjuster gear is formed in such a manner that a shortest distance defined between a rotation center of the adjuster gear and the cam surface where the ratchet pawl abuts is increased as the adjuster gear rotates in a biased direction, and
    the wheel cylinder rotates the adjuster restricting lever against a biasing force of the lever restricting spring so as to engage the ratchet teeth with the ratchet pawl when the controlling force of the wheel cylinder becomes larger than a predetermined force.

2. The drum brake apparatus as set forth in claim 1, wherein a first distance defined between the rotation center of the proximal end and the ratchet pawl is larger than a second distance defined between the rotation center of the proximal end and the controlling force receiving portion so that the tip end portion having the ratchet pawl is greatly displaced with a small displacement of the controlling force receiving portion.

3. The drum brake apparatus as set forth in claim 1, wherein the rotation center of the adjuster restricting lever is provided on slightly outer side of the control force receiving portion.

4. The drum brake apparatus as set forth in claim 1, wherein the wheel cylinder presses the controlling force receiving portion against the biasing force of the lever restricting spring.

5. The drum brake apparatus as set forth in claim 1, wherein the lever restricting spring controls a start point that the adjuster restricting lever restricts the rotation of the adjuster gear by a predetermined strength of the biasing force of the lever restricting spring.

6. The drum brake apparatus as set forth in claim 1, wherein the controlling force receiving portion is projected from the first brake shoe in a wheel cylinder side.

* * * * *